J. FINK.
Cultivator.
No. { 2,981, 33,985. }
Patented Dec. 24, 1861
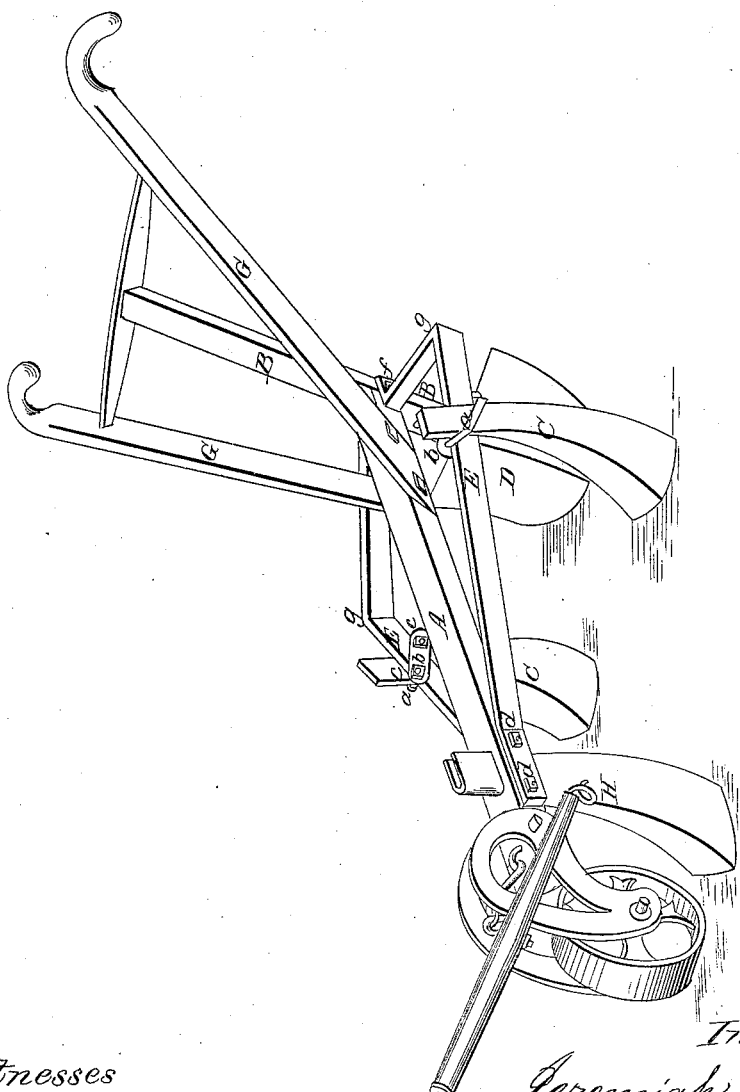
Witnesses
R. H. Osgood
W. F. Brown
Inventor
Jeremiah Fink
By his Attorney
J. S. Brown

UNITED STATES PATENT OFFICE.

JEREMIAH FINK, OF BALDWINSVILLE, NEW YORK.

IMPROVEMENT IN CULTIVATORS.

Specification forming part of Letters Patent No. 33,985, dated December 24, 1861.

*To all whom it may concern:*

Be it known that I, JEREMIAH FINK, of Baldwinsville, in the county of Onondaga and State of New York, have invented a new and Improved Cultivator; and I do hereby declare that the following is a full and exact description thereof, reference being had to the accompanying drawing, making part of this specification, and representing a view in perspective of a complete cultivator provided with my improvement.

Good cultivating is usually accomplished by means of two different cultivators—one a small-tooth cultivator of three or five teeth for breaking up the soil and cutting up the weeds, the other a shovel-plow or cultivator with one broad tooth or blade to follow the small-tooth cultivator and throw up the earth.

The object of my invention is to combine the two kinds of cultivators in one, either to be used thus or to be used separately, without increasing the cost above that of an ordinary small-tooth cultivator, or so that it may be made from the ordinary shovel-plow at little additional cost, and at the same time improving the implement in simplicity and strength and in capability of accurate and minute adjustment of the teeth as to width in cultivating.

I employ a single beam, A, with a back standard, B, projecting above the beam for sustaining the handles G G, and below the beam to receive the shovel-blade D, the whole composing a shovel-plow of ordinary construction. In the forward part of the beam A a central small tooth, H, may be and is generally inserted to precede the other tooth or teeth. To this shovel-plow I add two triangular or double-brace side wings, E E, each having a bend or angle, *g*, say about twice or three times as far from the forward as from the back end thereof, substantially as shown in the drawing, and having its two ends turned so as to be in one line or plane, to fit the sides of the beam A, and thereby form flanges for bolting the wings thereto. Two screw-bolts, *d d*, secure the forward ends of both wings to the beam, and one bolt, *f*, is sufficient to secure the back ends of both to the beam. The angles or bends *g g* are sufficient to give the requisite breadth to the small-tooth cultivator, to be formed by the addition of these wings. Then the additional fine teeth C C (two or four in number) are secured to these wings by gripes or clips *a a*, washer-plates *b b*, and nuts *c c*, or their equivalents, substantially as represented in the drawing. They are placed in and shifted to any position desired on the wings E E, and thereby are brought closer together or carried farther apart to any degree required, and this adjustment may be made as minute as it is possible to make any adjustment, since the positions may be varied only to a trifling extent or the whole length of the forward slope of the wings. The additional teeth C C being required in any case, the only additional expense thus to make a complete combined shovel-plow and small-tooth cultivator is that of the two simple wings E E (which are made of simple bar-iron) and the bolts for attaching them to the beam A; and at the same time, while the adjustment of the teeth is effective in a superior manner with this extreme simplicity, I add to the strength and firmness of the implement to a degree commensurate with the additional labor and strain to which the combined implement is subjected, so that the light beam of the shovel-plow becomes amply strong for the combined plow and cultivator, for the triangular-shaped wings applied to both sides of the beam, as specified, serve as strong and rigid braces to greatly strengthen the beam and the combination of beam and wings. This result is not effected by any other construction with which I am acquainted. The number of pieces is also reduced to the minimum, and those are of the simplest construction, so that the cost is also reduced to its minimum.

The implement may be used as a combined shovel-plow and small-tooth cultivator, as specified above, so as to complete the whole work of cultivating at one operation; or the wings E E (or simply the teeth C C) may be removed, leaving a simple shovel-plow; or the shovel D may be removed, leaving a simple small-tooth cultivator.

The forward central tooth, H, may be used with any of the forms into which the implement may be changed, and serves not only to assist in cultivating, but to steady the movement of the whole implement.

What I claim as my invention, and desire to secure by Letters Patent, is—

Combining with the beam A of a shovel-plow the triangular or double-brace wings E E, substantially as and for the purposes herein specified.

JEREMIAH FINK.

Witnesses:
GEO. A. STANSBURY,
ISAAC F. MINARD.